United States Patent [19]

Fox

[11] 3,975,258
[45] Aug. 17, 1976

[54] SAFETY SEAT BELTS FOR VEHICLE OCCUPANTS

[75] Inventor: John William Fox, Ashtead, England

[73] Assignee: P.C.S. Developments Limited, London, England

[22] Filed: July 9, 1974

[21] Appl. No.: 486,880

[30] Foreign Application Priority Data
July 9, 1973 United Kingdom............... 32608/73

[52] U.S. Cl.................................. 280/733; 222/3; 280/746
[51] Int. Cl.² ........................................ B60R 21/08
[58] Field of Search.... 280/150 AB, 150 B, 150 SB; 222/3, 5

[56] References Cited
UNITED STATES PATENTS

| | | | |
|---|---|---|---|
| 3,180,524 | 4/1965 | Shepard et al.................... | 222/83 X |
| 3,250,065 | 5/1966 | Frost ......................... | 280/150 AB X |
| 3,675,942 | 7/1972 | Huber........................... | 280/150 AB |
| 3,682,498 | 8/1972 | Rutzki ........................... | 280/150 AB |
| 3,732,944 | 5/1973 | Kendall ....................... | 280/150 B X |
| 3,773,350 | 11/1973 | Shibamoto.................... | 280/150 AB |
| 3,791,670 | 2/1974 | Lucore .......................... | 280/150 AB |
| 3,795,412 | 3/1974 | John............................. | 280/150 AB |
| 3,801,156 | 4/1974 | Granig...................... | 280/150 AB X |
| 3,841,654 | 10/1974 | Lewis ........................... | 280/150 AB |
| 3,843,150 | 10/1974 | Harada et al................. | 280/150 AB |
| 3,848,887 | 11/1974 | Fox............................... | 280/150 AB |

Primary Examiner—M. H. Wood, Jr.
Assistant Examiner—John P. Silverstrim
Attorney, Agent, or Firm—Lawrence E. Laubscher

[57] ABSTRACT

A safety apparatus for road and other vehicles, of belt form. The belt is essentially tubular but is normally in a collapsed condition, and is provided with resilient means which on operation of the belt cause the belt to expand in volume and to be filled with air through a one-way valve. The belt can be held in the collapsed condition by vacuum.

8 Claims, 12 Drawing Figures

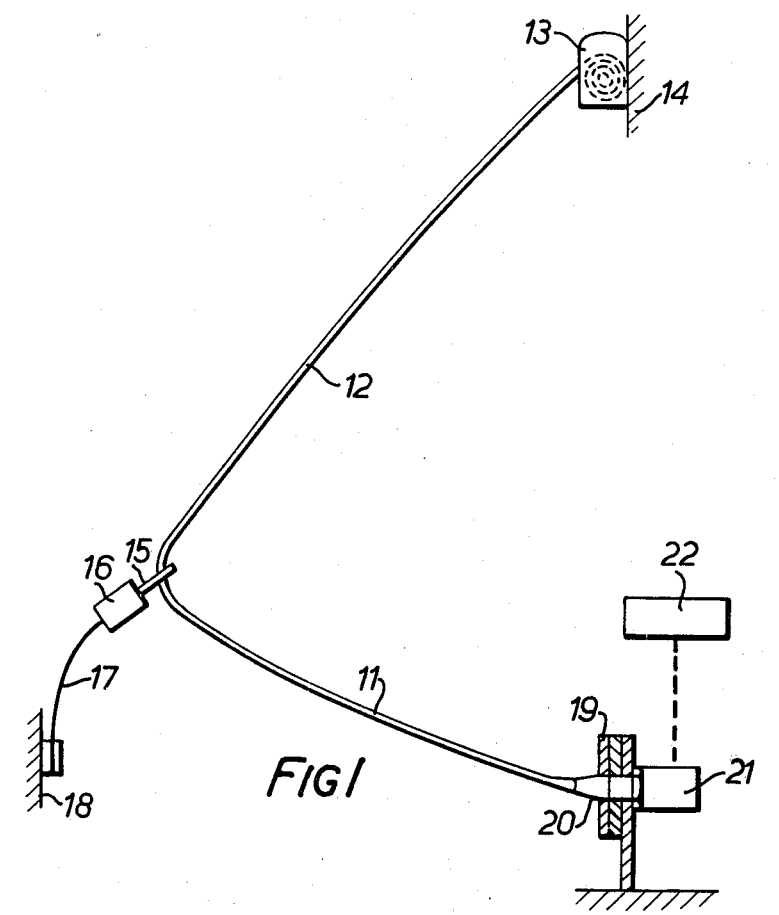
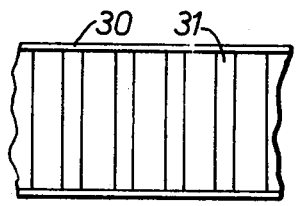
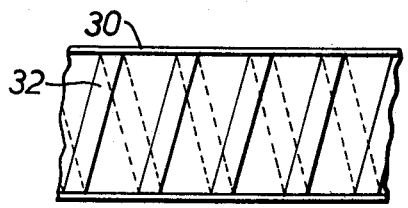
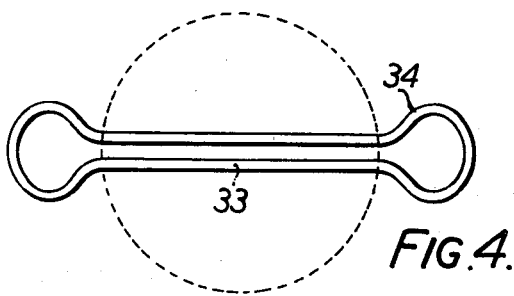

SAFETY SEAT BELTS FOR VEHICLE OCCUPANTS

This invention relates to safety apparatus for use in road or other vehicles to restrain an occupant of the vehicle in the event of a collision or other sudden deceleration of the vehicle.

In the past, there have been numerous suggestions for protecting an occupant of a vehicle in the event of collision, which results in the occupant being thrown forwardly against the structure of the vehicle. For road vehicles, one suggestion has been the use of an air bag of substantial volume, normally in a collapsed condition, but which in the event of collision is very rapidly expanded by compressed air. Such devices have various disadvantages, including the fact that in the event of fortuitous expansion, or failure to expand when required, the results may be serious. In the former case, the occupants view is obscured; in the latter case, in the event of failure there is no restraint imposed upon the occupant.

Another proposal has been the use of a belt resembling a conventional seat belt, but made as an inflatable tube, normally collapsed but inflated in the event of accident.

The present invention concerns a safety apparatus, essentially of belt form, which is satisfactory in operation. As will appear, the safety apparatus in accordance with the invention is of essential belt type, and the belt is formed as a tube or the like which is provided with springs or other equivalent means whereby the tube tends to assume a shape where its internal capacity has a relatively large volume. Normally, the belt is folded to a condition in which it has a lesser volume, and in the second condition the belt may resemble a conventional seat belt. In the event of collision, restraint on the resilient means tending to open the belt tube to its condition of greater volume is released, allowing the belt to become more effective in restraining the occupant, partly by virtue of increased area of contact, and also by pneumatic cushioning means.

The belt has the advantage that in the event of failure to expand to its condition of larger volume, the belt still gives the safety of a conventional seat belt.

In one form, the present invention provides a seat belt device for use in restraining an occupant of a vehicle in the event of sudden deceleration, said device comprising at least one hollow strap member in the form of a hose adapted to extend across part of the occupant of a vehicle so as to restrain the occupant in the event of an accident, said hose being evacuated and held by the vacuum in a collapsed condition against a restoring force tending to restore the hose to its uncollapsed shape, and further including valve means controlling an inlet passage to the hose to release the vacuum, and actuating means arranged to be operated in the event of an accident to open the valve means to release the vacuum.

The arrangement is such that on releasing the vacuum, the hose recovers its natural shape very rapidly. The time taken may be of the order of 10 milli-seconds.

In this way, the hollow belt provides a good cushioning effect without the need to inflate the belt.

Preferably the valve means is a one way valve permitting flow of air into the hose but not out of the hose.

In order to achieve quick recovery on release of the vacuum, resilient means are provided to assist recovery of the hose to its shape of greater volume. The hose may be, for example, provided with internal spring means, either within the hose or within the material of the hose, to cause it to recover its uncollapsed condition when the vacuum is released. The spring means is preferably adapted to lie substantially flat when the hose is in the collapsed condition. Furthermore, the hose itself preferably lies in a substantially flat condition when collapsed under the action of the vacuum.

The hose may be formed of elastic material but is preferably arranged to exhibit limited longitudinal extension. Alternatively the hose may be formed of material which permits limited plastic deformation. Such plastic deformation may provide some yield reducing the likelihood of damage to the occupant of the motor vehicle in the event of an accident. It is also possible for the one way valve to have a settable over pressure release so as to limit the maximum pressure which can be developed in the hose when the wearer is forced against the belt.

An advantage of the vacuum-restrained belt described is that if due to wear or tear or leakage there is a loss of vacuum restraining the belt and holding it in its collapsed condition, the leakage will permit the resilient means of the hose to expand it and it will be manifest to the user that the belt requires servicing.

One of the limitations of conventional seat belts in a vehicle is that there is a maximum width of belt which the occupant of the vehicle finds convenient to use. Ideally, the belt should have a maximum area of contact with the body of the wearer, so that in the event of the belt being used, the force due to the momentum of the wearer being thrown against the belt is spread over a wider area of belt, thereby reducing the contact pressure between the body of the wearer and the belt. Also, there is advantage in using pneumatic means in restraining the wearer of the belt, since this effectively increases the distance over which the wearer is decelerated, with an imposed pressure on the wearer which increases as the belt becomes compressed in volume.

The valve actuating means or other release means is arranged to respond to sudden deceleration in the vehicle; for example, the valve actuating means can be arranged to respond to tension in the belt or to some other control member such as a device fitted to the vehicle bumper to detect movement at the onset of a collision. The valve actuating means may be arranged to respond to sensing devices on the front and/or sides and/or back of the vehicle.

In some cases it may be desirable for the hose to be non-uniform along its length and arranged to provide one or more enlarged regions on recovery after release of the vacuum.

It will be appreciated that by using a hose held in a collapsed condition by vacuum, a fail-safe arrangement is provided. Should any leak accidentally occur, the belt will be allowed to recover its shape and thereby fail in a safe manner.

Some embodiments of the invention will now be described by way of example and with reference to the accompanying drawings in which:

FIG. 1 is a schematic view of a diagonal and lap belt;

FIG. 2 shows schematically a short length of one form of belt;

FIG. 3 is a corresponding view of an alternative arrangement;

FIGS. 4, 5, 6 and 7 show alternative spring arrangements which can be used in the belts described;

Figure 5:
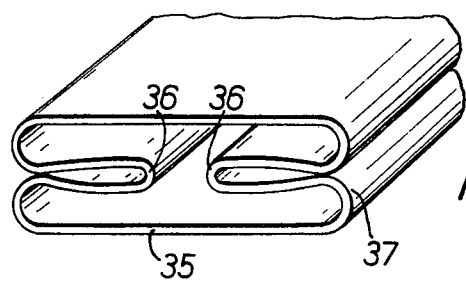

The diagonal and lap seat belt shown in FIG. 1 consists of a lap belt 11 and a diagonal belt 12. In this example, both belts are formed as one continuous length of hollow hose. The hose is mounted at its upper end in a conventional inertia reel arrangement 13 mounted on a pillar 14 of the vehicle. The belt has a catch 15 fitting into a mating catch element 16 attached by webbing 17 to a fixed part of the vehicle 18 in conventional manner. The belts 11 and 12 consist of hollow hose embodying resilient means, as will be hereinafter described. The lower end of the hose 11 is fixed to a floor mounted unit 19 so that the hose has an open end 20 passing through the unit to a valve unit 21 controlling connection of the open end 20 to the atmosphere. The unit 21 is controlled by an actuating device 22 which may be located at any suitable position in the vehicle. The device 22 may be a conventional inertia actuating device arranged to respond to sudden deceleration of the vehicle. Alternatively, it may be movable by a position sensitive control member located on the bumper or otherwise on the front or side of the vehicle so as to be moved at the onset of impact. Alternatively, it may be a control member arranged to respond to sudden operation of the vehicle brake pedal. It may also be arranged to respond to tension in the belt 11, 12.

The hollow belt 11, 12 is evacuated and held by the vacuum in a collapsed condition against an inherent restoring force tending to restore the hose to its uncollapsed shape. In the collapsed condition the belt lies in a substantially flat collapsed condition similar to a double thickness of seat belt webbing. When the device 22 detects sudden deceleration, the valve 21 is caused to open thereby admitting air to the interior of the belts 11 and 12. The vacuum pressure to be released is destroyed. The natural resilience of the material forming the belts 11 and 12, assisted by the springs located within the belt causes the belt to recover rapidly to its uncollapsed condition. In this state, it will be seen that the belt provides an area of contact with the body of the wearer which is greater than that of the collapsed belt, providing cushioning for the occupant during the period in which the belt restrains the occupant.

In the example shown in FIG. 1 a valve 21 is arranged to admit air through the open end 20 of the tubular hose, but the inlet passage to the hose may be provided at some other position or positions.

It will be appreciated that on operation of the valve 21, it is essential for the hose to recover its maximum shape very rapidly. The time taken may be of the order of 10 milli-seconds. To achieve this, the hose may be formed of a material having a strong tendency to recover its original shape on release of the vacuum, but it is preferable to assist the resilient action of the hose by the provision of positive resilient means, such as for example springs, within the belt. The hose material surrounding the springs is thin and flexible as well as impervious. It must have sufficient resistance to longitudinal extension to restrain the occupant in position. The hoop strength of the hose should be sufficient to withstand normal use of the belt but when operated in the event of an accident, the belt is not inflated and consequently the hoop strength does not have to be sufficient to withstand internal pressure.

Various alternative formations of the hose and internal springs are shown in FIGS. 2 to 7. In FIG. 2 the hose material 30 surrounds a plurality of hoop-like springs 31 arranged at intervals along the length of the belt. In an alternative arrangement shown in FIG. 3, the springs 32 are wound in a continuous helical fashion. If desired, the springs of either embodiment may be bonded to the walls of the associated tubular member in which they are mounted. In the arrangement shown in FIG. 4, the full lines show a spring 33 in the collapsed condition surrounded by hose material 34. The springs lie closely together in the central part of the belt while the extremities of the width of the belt retain a large radius of curvature to avoid damaging the springs. The dotted lines show the expansion of the spring to form a tubular hose when the vacuum is released. The arrangement shown in FIG. 4 represents a section through the belt and the spring may be formed as a number of separate hoops of the type shown in FIG. 2 or alternatively wound as a continuous helical spring as shown in FIG. 3.

Figure 6:
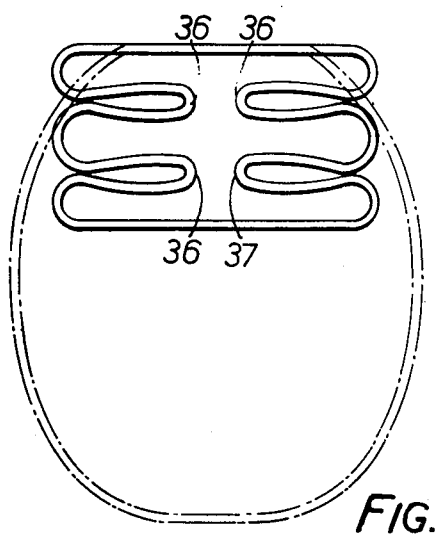
Figure 7:
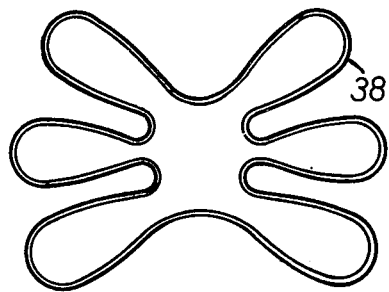
Figure 8:
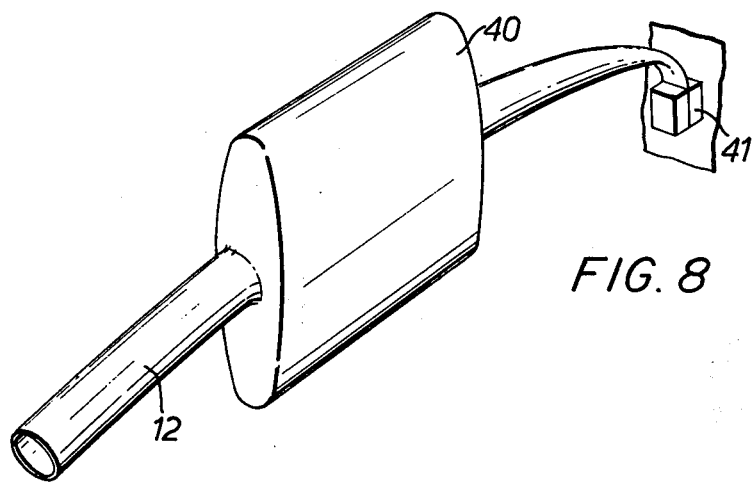
FIG. 8 is an alternative form of belt which has been permitted to release to its shape of greater volume.

In FIG. 5 the spring 35 has two flat faces at opposite sides of the thickness of the belt with an inwardly looped portion 36 projecting in from each side. The spring is again surrounded by the hose material 37. When the vacuum is released the hose recovers its uncollapsed condition by the inward loops 36 moving outwardly to increase the internal volume of the belt. FIG. 6 shows a generally similar arrangement in which two loops 36 project inwardly on each side. The dotted lines in FIG. 6 show the expansion of the belt when the vacuum is released. FIG. 7 shows an alternative looped spring in which the inward projecting loops lie on two part circles at the sides of the belt. The hose material is not shown in FIG. 7 but the looped spring 38 would be surrounded by a corresponding sleeve of hose material. In each of the examples shown in FIGS. 5 to 7, the springs may be formed of short axial length so that a number of discrete springs are located at spaced positions along the belt or alternatively the springs may be wound as a continuous helix extending along the length of the belt.

It is advantageous if the valve 21 is a one way valve which allows air from the atmosphere to freely enter the interior of the belt but prevents air that has entered the belt escaping substantially back to the atmosphere.

Operation in this way has an important advantage in the functioning of the safety device. When the belt is released, it will assume a maximum volume, and will become filled with air at a pressure which approximates atmospheric pressure. While this is happening, it is to be assumed that the wearer of the belt is moving forwardly; in normal practice there will be an interval of time, while the ordinary slack in the belt is being taken up, before pressure is imposed on the body of the wearer by the tightening belt. By this time, it is assumed that the belt has become substantially filled with air. As the body of the wearer continues to move forwardly, pressure is imposed on the belt in a manner which will tend to make its enclosed volume decrease. This diminution of volume brings about an increase of pressure within the belt, so that the ultimate pressure may be substantially above atmospheric pressure. It is to be observed that this effect is obtained without the use of sources of pressure air or gas on the vehicle.

The pressure produced in this way within the belt, may, depending upon the extent to which the enclosed volume of the belt, under the force imposed by the weight of the user, can rise to substantial value, and approaching a value which would be obtained with a conventional webbing seat belt. This effect can be diminished by arranging that the control valve, or an equivalent valve, is arranged to release or blow-off at a suitable pressure above atmospheric. Such an arrangement will delay the onset of maximum pressure on the body of the wearer.

In this way, the hose is prevented from collapsing under the pressure of the occupant during the period of restraint. The valve is arranged so that the belt maintains its recovered shape for at least one second. The belt may be made of elastic material provided it resists longitudinal extention. Alternatively, the belt may be made of material which permits limited plastic or controlled deformation. In this way a certain amount of yield is obtained.

Figure 12:
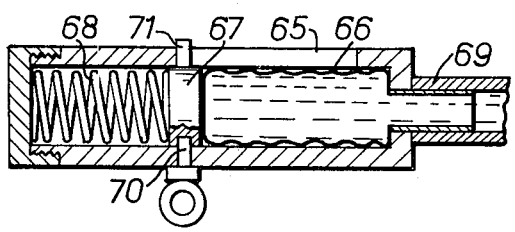
FIG. 12 is a sectional view of an actuator for the belt of FIGS. 9 to 11.

The invention is not limited to the details of the foregoing examples. One or more valves may be provided for releasing the vacuum within the belt. For example, in the arrangement shown in FIG. 1, separate valves may be provided for the two belt sections 11 and 12. In order to increase the area of the belt in contact with the occupant in the event of an accident, the belt member is preferably formed of an expandable material so that the width of the strap is greater when the vacuum is released. Conveniently, the strap member may be arranged so that when released, the width is substantially double that of the collapsed state. Conveniently the strap member is of generally circular cross section or oval when released. One or more regions along the length of the strap member may be formed of material with different recovery characteristics than the rest of the belt so as to recover to a greater extent and thereby provide an enlarged protective cushion at one or more required positions. Such an arrangement is shown in FIG. 12 in which a diagonal belt 12 has an enlarged head protective cushion 40. The upper end of the belt is in this case fixed to a mounting 41 on a side pillar of the car.

The invention is applicable to a lap strap or a diagonal strap or both. It may also form part of a full harness or any other seat belt arrangement using straps. By the use of such self-recovery belts, the belt in the collapsed condition may be loosely positioned around the occupant and in the event of an accident, the belt rapidly recovers so as to tighten up around the occupant and provide a much increased surface area in contact with the occupant. This reduces pressure at local positions on the occupant thereby reducing the risk of injury. Should the belt release accidentally at a time when not required, no harm is done and the driver's ability to control the vehicle is not impaired. Furthermore, should the belt fail to release its vacuum when required the body still has the protection of a normal seat belt. Furthermore, any tear or hole in the belt will cause the belt to recover to its normal state and thereby provide a fail-safe arrangement.

The belt can form part of any electrical interlock system and may also be adapted for use in a passive restraint system.

The belt material is chosen so that on recovery, the belt recovers radially without an increase in overall length. In some cases it may be desirable to arrange that on recovery, the belt shortens in length.

It will be appreciated that on recovery, the belt is not inflated and merely contains air at atmospheric pressure. When the occupant presses against the belt there may be a tendency for the pressure to rise above atmospheric and in this case, the valve mechanism closes the outlet from the belt so as to prevent escape of air.

The belt may be re-used by relatching or by re-application of vacuum to one or more valves thus causing the belt to resume its collapsed condition.

Figure 9:
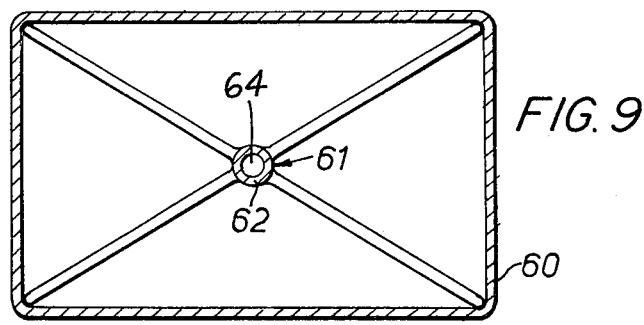
FIG. 9 is a cross sectional view of another form of belt, in expanded condition.
Figure 10:
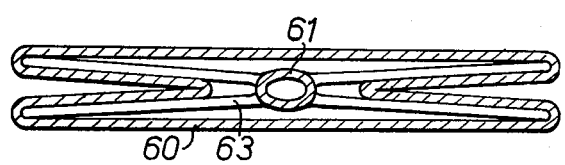
FIG. 10 is a cross sectional view of the belt of FIG. 9, in collapsed condition for use.
Figure 11:
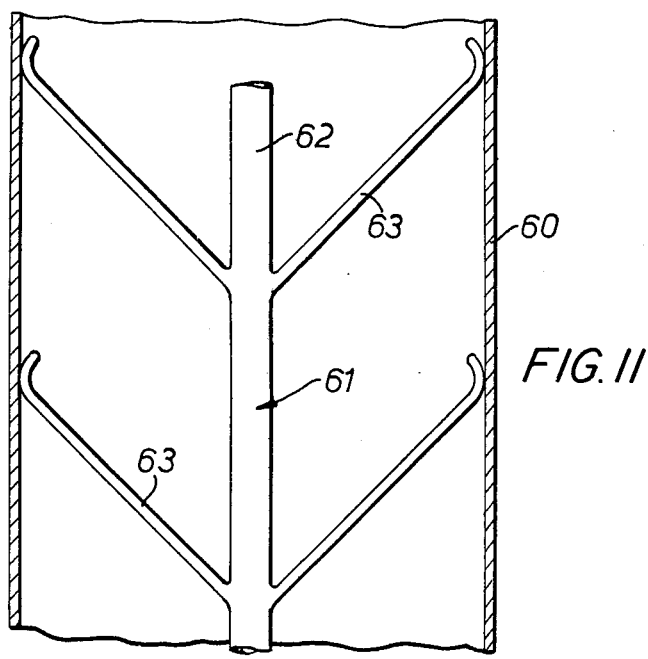
FIG. 11 is a longitudinal sectional view of the belt of FIG. 9.

Another form of belt is shown in FIGS. 9 to 11. This belt is also in the form of a tube 60, which is air impermeable, and the tube contains a member 61 which, on actuation of the belt, causes it to expand the belt. Member 61 comprises an elongated central spine member 62 from which extend at intervals a series of resilient arms 63. Preferably, as shown in FIG. 11, the arms are inclined to the length of the spine in their normal state. The arms can be folded down, in the manner indicated in FIG. 11, when the belt is collapsed.

The member 61 can be used in various forms. It can, for example, be used in a belt in which the belt is held in collapsed condition, as in FIG. 14, by vacuum pressure. In this case, the member 61 is made of a relatively stiff but resilient plastic material, so as to exert adequate outward force to expand the belt. The central spine 62 is then preferably solid in cross section.

The member 61 can also be modified so that it develops its resiliency, to generate force to expand the belt, only on actuation of the belt. In this form, the central spine 62 is made tubular with one or more cavities 64 running along the length of the member. One end of each of the tube or tubes thus formed is closed, and the other end is connected to a source of fluid pressure. In normal conditions when the belt is in use, the pressure within the tube or tubes of the member is low, and in this condition the resiliency of the member 61 is insufficient to expand the belt. On actuation, fluid pressure is applied to the tubes, causing the arms to move and expand the belt.

The fluid pressure can be pneumatic or hydraulic, and a simple actuator for producing the necessary fluid pressure is shown in FIG. 12. A cylinder 65 contains a bellows 66 against whcih acts a piston 67 urged by a powerful compression spring 68. The interior of bellows 66 is connected through a pipe 69 to the tubes of member 61.

Normally spring 68 is held compressed by a latch pin 70 which passes throuugh the cylinder wall and enters the piston. In the event of a collision, latch pin 70 is withdrawn and high pressure is developed in the fluid in the bellows. If necessary, the actuator can be reset by a tool applied to a reset pin 71 on the cylinder.

What I claim is:

1. A safety seat belt for protecting the occupant of a vehicle upon the occurrence of an accident, comprising
   a. a flexible tubular impervious seat belt member adapted for connection with the vehicle to extend across at least one of the lap and chest portions of the occupant, at least a portion of said seat belt member being generally radially expansible and collapsible between collapsed and expanded conditions, respectively, said seat belt member in the collapsed condition having a generally flat cross-sectional configuration;

b. means establishing a vacuum in said seat belt portion to normally maintain the same in the collapsed condition;
c. means operable upon the application of impact to the vehicle to release the vacuum in said seat belt portion; and
d. means including resilient means for expanding the seat belt portion to the expanded condition.

2. A safety belt in accordance with claim 1, wherein said resilient means is arranged within said tubular member.

3. A safety belt in accordance with claim 2, wherein said resilient means is bonded in the walls of said tubular member.

4. A safety seat belt for protecting the occupant of a vehicle upon the occurrence of an accident, comprising
a. a flexible tubular impervious seat belt member adapted for connection with the vehicle to extend across at least one of the lap and chest portions of the occupant, at least a portion of said seat belt member being generally radially expansible and collapsible between collapsed and expanded conditions, respectively;
b. means including a normally closed valve for establishing a vacuum in said seat belt portion to normally maintain the same in the collapsed condition;
c. means operable upon the application of impact to the vehicle to open said valve to release the vacuum in said seat belt portion; and
d. means including resilient means for expanding the seat belt portion to the expanded condition.

5. Apparatus as defined in claim 4, wherein said resilient means normally imposes on said seat belt portion a force insufficient to fully expand said seat belt portion to its fully expanded condition; and further including means for applying pressure fluid to said resilient means to increase the force thereof to fully expand the seat belt portion to its expanded condition.

6. Apparatus as defined in claim 5, wherein said resilient means is hollow and sealed; and further wherein said pressure fluid applying means includes a source of pressure fluid for supplying pressure fluid to said resilient means.

7. Apparatus as defined in claim 6, wherein said pressure fluid source includes means (68) for storing energy, and releasable latching means (70) normally retaining said storage means in an energy-storing condition and said pressure source in a deactivated condition, whereby upon release of said latching means, said storage means releases energy to activate said pressure fluid source and thereby supply pressure fluid to said resilient means.

8. A safety belt in accordance with claim 7, wherein said energy storage means is a spring.

* * * * *